United States Patent [19]

Fukuoka

[11] Patent Number: 4,733,347

[45] Date of Patent: Mar. 22, 1988

[54] METHOD AND APPARATUS FOR SYNCHRONIZED CONCURRENT PROCESSES

[75] Inventor: Kazuhiko Fukuoka, Machida, Japan

[73] Assignee: Hitachi, Ltd., Tokyo, Japan

[21] Appl. No.: 654,896

[22] Filed: Sep. 27, 1984

[30] Foreign Application Priority Data

Sep. 30, 1983 [JP] Japan ............................. 58-180232

[51] Int. Cl.⁴ ............................................. G06F 9/46
[52] U.S. Cl. ................................... 364/200; 364/300
[58] Field of Search ... 364/200 MS File, 900 MS File, 364/300

[56] References Cited

U.S. PATENT DOCUMENTS

| | | | |
|---|---|---|---|
| 4,197,579 | 4/1980 | Otis, Jr. et al. | 364/200 |
| 4,224,664 | 9/1980 | Trinchieri | 364/200 |
| 4,229,790 | 10/1980 | Gilliland et al. | 364/200 |
| 4,257,096 | 3/1981 | McCullough et al. | 364/200 |
| 4,316,245 | 2/1982 | Luu et al. | 364/200 |
| 4,369,494 | 1/1983 | Bienvenu et al. | 364/200 |
| 4,384,324 | 5/1983 | Kim et al. | 364/200 |
| 4,394,725 | 7/1983 | Bienvenu et al. | 364/200 |
| 4,395,757 | 7/1983 | Bienvenu et al. | 364/200 |

Primary Examiner—Gareth D. Shaw
Assistant Examiner—Kevin A. Kriess
Attorney, Agent, or Firm—Antonelli, Terry & Wands

[57] ABSTRACT

A synchronized concurrent process system incorporating a data driven control with a time attribute being assigned to the shared data. The term "data driven control" means a process operation sequence control system which satifies the following three conditions. In condition 1, a process is allowed to initiate its operation when all the data items to be referred to by the process are generated by other processes; in condition 2, during a time period from when a processing initiates its operation to when the processing terminates its operation, the other processes are prohibited to update any data item to be referred to by the process, and in condition 3, only when a process terminates its operation, the other processes are allowed to refer to all the data items generated by the process. However, the data driven control alone is not satisfactory. Recognizing the existence of shared data, a time attribute (interior clock) is provided to discriminate the same data before and after updating. This provision has advantages:

(i) The procedures for the synchronous control and the mutual exclusive control need not be inserted in an intermediate location of a program, (ii) all processes can operate concurrently (The wait state is not necessary); and (III) a computer system can be provided with the deterministic characteristic.

5 Claims, 8 Drawing Figures

METHOD AND APPARATUS FOR SYNCHRONIZED CONCURRENT PROCESSES

BACKGROUND OF THE INVENTION

1. Field of the Invention

The present invention relates to an information processing system or a control system using means such as a computer and comprising a multiplicity of processes which operate concurrently and a multiplicity of data items created by these processes, and in particular, to a method and an apparatus for synchronized concurrent processes.

2. Description of the Prior Art

In a realtime system, a plurality of processes (tasks) which share data items operate concurrently. Although the concurrent operations conducted by processes improve the response performance of the system, the deterministic characteristic of the system is lowered. A system without the deterministic characteristic is apt to cause errors with respect to the execution sequence, and it is quite difficult to detect such an error in advance and to correct the error. Consequently, a realtime system requires a means (control of concurrent process operations) for providing the deterministic characteristic. Although the Communicating Sequential Process (CSP) of Hoare (C.A.R., Hoare, CACM, vol 21, pp. 666–677 (1978)) is a superb system of a data driven type of controlling the sequence of process operations, it has a problem that shared data can not be handled.

In a realtime system comprising a plurality of processes (steps for sequentially executing programs) and a plurality of data items (results of process operations), each process generates data items to be referred to by other processes by referring to data items created by other processes. As a result, a data item is shared among a plurality of processes, and accordingly, the following control for process operation sequence are required.

(1) Synchronous control

If a process is to refer to a data item generated by another process, the data item should be allowed to be referred to only when the data item has been generated.

(2) Mutual exclusive control

A data item which is in the process of being referred to or updated by a process should be inhibited from being updated by other processes.

Insertion of procedures necessary for the synchronous and mutual exclusive controls into an intermediate location of a program is difficult. It is even more difficult to prove that these controls are sufficient. It is desirable that the procedures for the synchronous and mutual exclusive control not be required to be inserted in the program.

SUMMARY OF THE INVENTION

It is therefore an object of the present invention to provide an apparatus and a method universally employable for synchronized concurrent processes, wherein the apparatus and method solve above-mentioned problems so that the procedures for the synchronous control as well as the mutual exclusive control are unnecessary, and are applicable also to a computer system which processes shared data.

In order to achieve the object described above, the present invention is characterized in that the shared data is also subjected to a synchronized concurrent process driven by data having a time attribute.

According to one aspect of the present invention, there is provided a method for synchronized concurrent processes in an information processing system including a plurality of processes for executing various processes and a plurality of data items generated by the plurality of processes, comprising a step of keeping a time attribute for each data item, a step of keeping a time attribute for each process, a step of keeping identification information and time conditions for all data items referred to carry out a process, and a step of initiating, when a condition of a time attribute of each data referred to by the process is satisfied, a process which is to be executed on the basis of the time attribute of the process.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

The present invention is characterized in that the shared data is also subjected to the synchronized concurrent process system incorporating a data driven control which data is given a time attribute.

Here, the "data driven control" means a process operation sequence control system which satisfies the following three conditions.

Condition 1

A process is allowed to initiate its operation when all the data items to be referred to by the process have been generated by other processes.

Condition 2

During a time period from when a process is initiated to when the process is terminated the other processes are prohibited from updating any data item to be referred to by the process being executed.

Condition 3

Only when a process is terminated, will the other processes be allowed to refer to all the data items generated by the process.

However, incorporation of the data driven control alone is not sufficient. If processes and the relation of generation of and reference to data items are represented by use of arrows on the assumption that shared data items exist, a closed loop is necessarily created via shared data items in any case. From the viewpoint of the data driven control, the closed loop should be interpreted as meaning that a process creates a data item by referring to the data which the process itself is about to create now or by referring to a data item which will be created by a process that refers to the data item created by the process. However, this is a discrepancy. In view of the above-mentioned problem, the present invention provides a time attribute (interior clock) for discriminating one shared data item before and after updating.

The basic concept of the present invention is as follows. In order to handle the same shared data item as a different data item before updating and after updating, the data item which keeps the content of shared data item D at time t is represented by D(t). Time t is a time attribute indicating the age of the shared data item, and this attribute time is referred to an interior clock. When old data is distinguished from new data by assigning the interior clock to the data, the shared data item and the discrepancy of the before-stated closed loop is removed.

The interior clock of data is determined in accordance with the following algorithm.

(1) An interior clock having time t is assigned to the data items obtained from an external space during a time period between time t-γ and time t, where γ is a constant indicating an interval of time.

Figure 1:
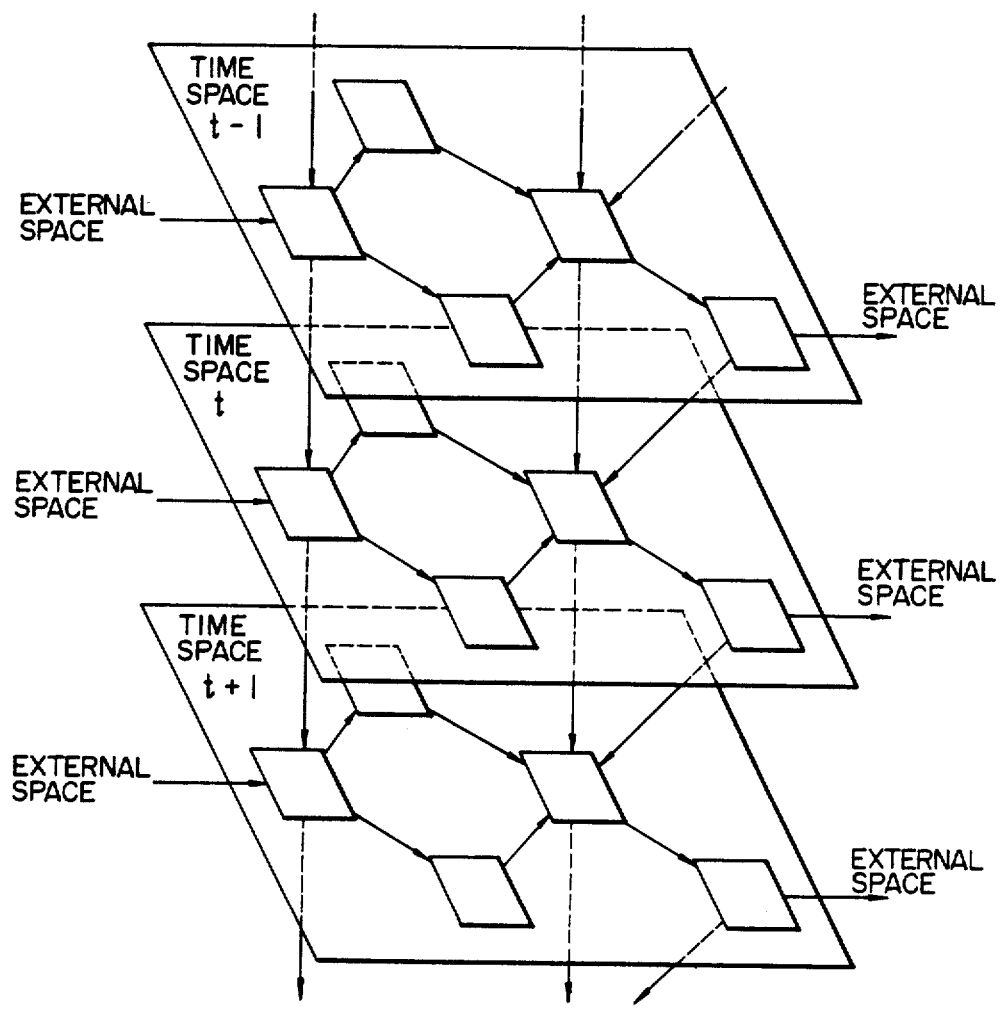
FIG. 1 is an explanatory schematic diagram illustrating the fundamental concept of the present invention.

(2) An interior clock having time t is assigned to the data items generated by the processes each having an interior clock indicating time t. In this case, however, these processes may refer to data items which have older ages than time t. Assuming that all data items having interior clocks of the same time and all the processes that create these data items are arranged on a two-dimensional plane (a time-space at the same time). The time-spaces exist at constant time intervals over the past to the future. A regular three-dimensional structure can be obtained by arranging each time-space in the order of time to express processes and the relation of generation of and reference to data items (Refer to FIG. 1).

Next, a method for implementing an interior clock of data will be described.

A process refers to data items generated by other processes. A data item to be referred to is identified by a name and a time difference between the interior clock of the data item and that of a time that data item was generated by the process. The description language (process definition statement) for defining a process is as follows:

Process $p(a_1-s_1,—, a_n-s_n)$ where, p is a process name, $a_i$ indicates a reference data name, and $S_i$ represents a time difference of reference data. An expression $a_i-a_i$ can be abbreviated to be $S_i$, and in this case, $S_i$ is assumed to be zero.

A process cannot refer to any data items created by other processes other than those defined by the process definition statement. The data items defined by a process definition statement are used as they are in programs corresponding to the pertinent process. For example, a, a-1, and a-2 each having the same name but a different time in each interior clock can be utilized with a clear distinction therebetween.

All processes are controlled in accordance with the same rule. A process is initiated when all reference data items defined by a process definition statement of the process are generated. That is, if $a_i$-$S_i$ is specified as a reference data item, a process which operates in the time space of time t is initiated when all the data items $a_i$ each having an interior clock indicating time (t-$S_i$) are generated. When the operation is normally terminated, the process generates a data item which has the same name as that of the process and which has an interior clock indicating time t.

An embodiment of the present invention will be described by referring to FIG. 2. In this embodiment, a control system 2 of FIG. 2 comprises main hardware function blocks in accordance with the present invention.

A process initiation request is transferred form the control system 2 to a computer system 1, while a process termination report is transmitted from the computer system 1 to the control system 2.

The control system comprises a function for process termination 3 and a function for initiation judgment 4.

On receiving a process termination report, the function for process termination 3 performs a processing of time attribute date 6 to set a state, in accordance with a table for generation of data 5, for indicating that data items produced by the terminated process have a new time attribute.

Figure 3A:
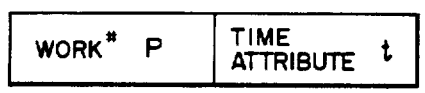
FIGS. 3a to 3f are explanatory diagrams concretely depicting various tables which appear in FIG. 2.

The operation is initiated when a process termination report from the computer system is received. Together with the process termination report from the computer system, information for identifying the process terminated is also received. That is, the structure of the process termination report is comprised of data comprising a process no. (#)p representing the process and a time attribute t thereof (Refer to FIG. 3a).

The following is a structure of a table for generation of data: A table for generation of data is created for each process #. Each table for generation of data 5 keeps a data # ($d_{p,i}$:i = 1 to $n_p$) of a data group generated as a result of execution of each process (process #P). (Refer to FIG. 3C for details. In the figure, the process numbers are indicated as #1, #2, #3, etc. on the upper-left corner of each table.)

Figure 2:
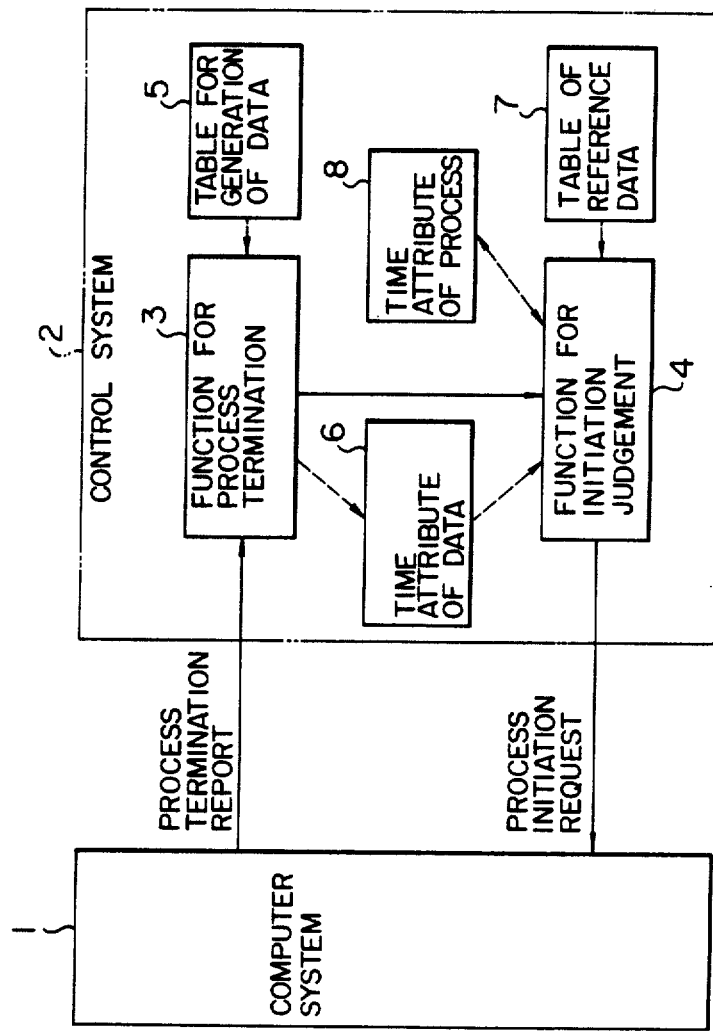
FIG. 2 is a diagrammatic representation of the overall structure of the present invention.

The processing of process termination 3 of FIG. 2 is conducted as follows: By referring to the table 5 for generation of data which corresponds to a process #p contained in a process termination report received from the computer system, the time attribute t of the process contained in the process termination report is set to the data time attribute $DTIMEd_{p,i}$ in the table 6 of a data #$d_{p,i}$ (i=1 to $n_p$) corresponding to the terminated process.

Next, the table for the time attribute of data 6 shown in FIG. 2 will be described. This table is structured as illustrated in FIG. 3e and is provided to keep a time attribute $DTIMEd_{p,i}$ which indicates for each data # a time up to which the data items associated with each data # have been generated.

The function for initiation judgment 4 will be explained in the following.

The primary function thereof is to judge whether or not a process can be initiated and to issue a process initiation request if the process is allowed to be initiated. Initiation judgment starts when the operation of the processing of the function for process termination is completed.

Function and structure of the table of reference data 7 is explained as follows: A table of reference data is generated for each process number (#). Each table of reference data keeps a data number (#) ($d'_{p,j}$:j=1 to $m_p$) of a reference data group and time difference ($\Delta_{p,j}$:j=1 to $m_p$) which are necessary for executing each process (process #p). FIG. 3d depicts the configuration a table of reference data 7.

Figure 3B:
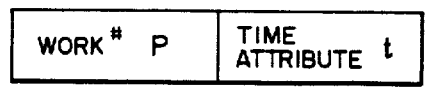
Figure 3C:
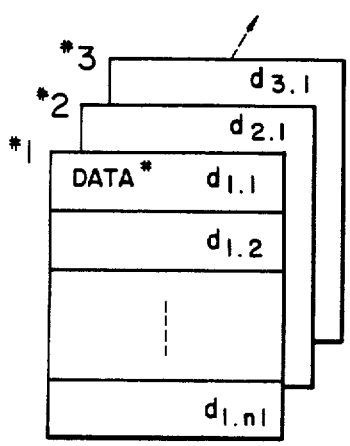
Figure 3D:
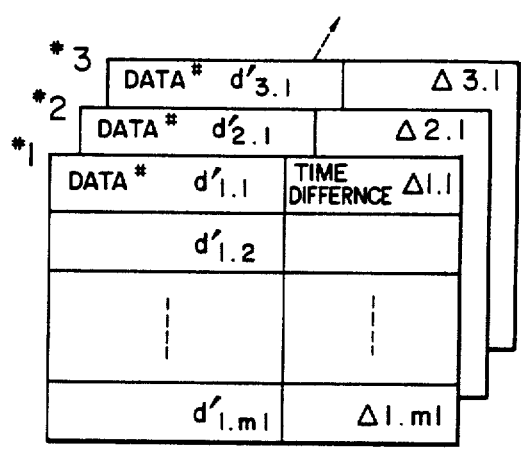
Figure 3E:
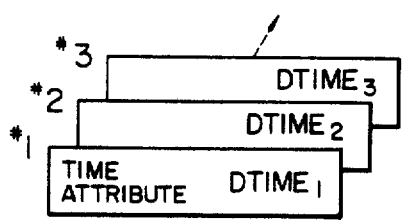
Figure 3F:
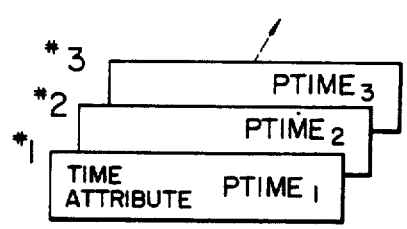

The function of time attribute of process 8 is used to keep for each process number (#) a time attribute $PTIME_p$ of the next process which should issue an initiation request (FIG. 3f).

The initial judgment 4 performs the following processing for all the processes:

The process time attribute $PTIME_p$ stored in the table 8 and the data $d'_{p,j}$ (j=1 to $m_p$) and the time difference $\Delta p_{p,j}$ stored in the table 7 are read out for each process #p and by referring to the corresponding data time attribute $DTIMEd'_{p,j}$ stored in the table 6, to each data $d'_{p,j}$, it is judged whether or not the following condition is satisfied:

$$DTIMEd'_{p,j} \geq PTIMEp - \Delta_{p,j}.$$

If this condition is satisfied for all the data $d'_{p,j}$ (j=1 to m) required by one process, a process initiation request (process #p and time attribute $PTIME_p$) is issued to the computer system 1 and the process time attribute $PTIME_p$ registered in the table 8 for the one process is incremented by one. The quantity $\Delta_{p,j}$ defines a valid time range.

A process initiation request comprises a set of a process #p indicating a process to be initiated and a time attribute t thereof (Refer go FIG. 3b).

Although a time attribute contained in a process termination report is stored in a table for generation of data 5 and a process time attribute 8 is incremented by one after a process initiation request is issued in the foregoing explanation, it is possible to store the different time attribute for the same purposes in either case depending on the process.

The explanation above has been given about a case in which hardware functions are employed, however, such functions can be also executed by a software routine in an existing computer system.

In accordance with the present invention, a time attribute is assigned to each data item in an information processing system of, for example, a computer in such a manner that even the same data is regarded as different data if the time attribute thereof is different. Consequently, a data-driven-type process operation control becomes possible also in a computer system handling shared data.

Moreover, the following advantages are obtained for adoption of the data-driven-type control.

(i) The procedures for the synchronous control and the mutual exclusive control need not be inserted in an intermediate location of a program.

(ii) All processes can operate completely concurrently. (The wait state is not necessary.)

(iii) A computer system can be provided with the deterministic characteristic.

Although these advantages are obtained when implementing the present invention with a hardware configuration, these advantages will be obtained by employing software in an existing computer system, excepting the efficiency of, for example, processing speed.

What is claimed is:

1. A process execution control method for use in an information processing system which executes a plurality of processes each referring to at least one data item, to produce, as a result of execution, at least one data item, comprising:
   a first step of storing, for each of said processes, an identifier of a data item to be referred to by each process and a time condition representative of a valid time attribute to be assigned to said data item;
   a second step of storing, for each of said processes, time attribute information representative of a time point at which each process is to be executed;
   a third step of storing a data item produced by executing a given one of said processes and said time attribute information of said second step associated with said executed process;
   a fourth step of referring to time attribute information of each of the data items which have been already produced and selecting out of said plurality of processes one process in which every data item to be referred to by said one process satisfies said time condition previously defined at said first step; and
   a fifth step of executing said selected process and updating said time attribute information corresponding to said executed process, so that said time attribute information of said executed process indicates an updated time point;
   whereby data items having an identical identifier are given different time attribute informations depending upon time points of execution of a process by which execution of said data items have been produced, and a data item identified by said time attribute information is referred to by each process.

2. A process execution control method according to claim 1, further comprising a sixth step of storing updated time attribute information for each data item produced by executing said processes wherein said process selection at said fourth step is effected by judging whether or not all of said data items which meet said time condition have been already produced, on the basis of said time condition for each data item, said time attribute information for each process stored at said second step and said updated time attribute information, stored at said sixth step, for said each data item.

3. A process control method according to claim 1, wherein said time attribute information to be updated at said firth step for said each process is given as a numerical value representative of the number of times said each process has been executed, said numerical value being incremented each time said each process is executed.

4. An information processing system which executes a plurality of processes each referring to at least one data item and produces new data as a result of the execution, comprising:
   first means for previously storing, for each process, a name of each data item to be referred to by said each process and a time difference necessary for executing each process;
   second means for storing, for each process, time attribute information representative of a time point at which said each process is to be executed;
   third means for executing a given one of said processes to produce a data item and storing the produced data item and said time attribute information produced by said executed process; and
   fourth means for selecting out of said plurality of processes one process which s one that all of said data items to be referred to by said one process have been already produced, on the basis of said time condition, stored in said first means, of each data item, said time attribute information, stored in said second means, of each process and said time attribute information of each data item which has been already produced by said third means, and for issuing to said third means, when said third means has completed the execution of a given one process, a request for executing said selected process, together with time attribute information to be assigned to a data time to be produced by said selected process, said fourth means updating said time attribute information stored in said second means so as for said time attribute information to indicate a value representing an updated time point with respect to said selected process to which said request for execution is issued;

whereby data items having an identical name are given different time attribute informations depending upon time points of execution of a process by which execution said data items have been produced and a data item identified by said time attribute information is referred to by each process.

5. An information processing system according to claim 4, further comprising:

fifth means for storing a latest time attribute information for each data item produced by said plurality of processes; and sixth means for updating, when execution by said third means of a given one process has been completed, said latest time attribute information associated with a data item produced by said given one process, wherein said fourth means refers to said fifth means in order to judge the time attribute information of each data which has been produced by said third means.

* * * * *